(12) United States Patent
Du et al.

(10) Patent No.: US 10,779,261 B2
(45) Date of Patent: Sep. 15, 2020

(54) STATION RELAY METHOD, APPARATUS, AND SYSTEM

(71) Applicant: Huawei Technologies Co., Ltd., Shenzhen (CN)

(72) Inventors: Zhenguo Du, Shenzhen (CN); Yunsong Yang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/314,079

(22) PCT Filed: Jun. 30, 2016

(86) PCT No.: PCT/CN2016/088021
§ 371 (c)(1),
(2) Date: Dec. 28, 2018

(87) PCT Pub. No.: WO2018/000385
PCT Pub. Date: Jan. 4, 2018

(65) Prior Publication Data
US 2019/0208502 A1 Jul. 4, 2019

(51) Int. Cl.
*H04J 1/10* (2006.01)
*H04W 68/02* (2009.01)
(Continued)

(52) U.S. Cl.
CPC .......... *H04W 68/02* (2013.01); *H04B 7/155* (2013.01); *H04B 7/2606* (2013.01);
(Continued)

(58) Field of Classification Search
CPC ... H04W 88/04; H04W 40/22; H04W 84/047; H04B 7/15507; H04B 7/2606
See application file for complete search history.

(56) References Cited

U.S. PATENT DOCUMENTS 10,356,710 B2 * 7/2019 Senarath ........... H04W 52/0277
2006/0227753 A1 * 10/2006 Vleugels ............... H04W 92/02
370/338
(Continued)

FOREIGN PATENT DOCUMENTS

CN 103209468 A 7/2013
CN 103404202 A 11/2013
(Continued)

OTHER PUBLICATIONS

ETRI, "Discussion on Relaying for D2D Proximity Services", 3GPP TSG-RAN WG2 Meeting #83, R2-132592, Barcelona, Spain, Aug. 19-23, 2013, 7 pages.
(Continued)

*Primary Examiner* — Atique Ahmed
(74) *Attorney, Agent, or Firm* — Slater Matsil, LLP

(57) ABSTRACT

A method includes: determining, by an access point based on remaining quantities of electricity and/or location information of all stations in at least one station group in a basic service set, an identifier of a type-1 station in each of the at least one station group and available time window information that corresponds to each type-1 station, and generating a notification message including relay enabling information of the at least one station group, relay enabling information of each station group includes identifiers of at least two type-1 stations in the station group and the available time window information of each type-1 station; and broadcasting, by the access point, the notification message in the basic service set.

20 Claims, 8 Drawing Sheets

(51) Int. Cl.
*H04W 52/02* (2009.01)
*H04B 7/26* (2006.01)
*H04B 7/155* (2006.01)
*H04W 88/08* (2009.01)

(52) U.S. Cl.
CPC ....... *H04W 52/02* (2013.01); *H04W 52/0206* (2013.01); *H04W 88/08* (2013.01); *Y02D 70/00* (2018.01)

(56) References Cited

U.S. PATENT DOCUMENTS

| | | | |
|---|---|---|---|
| 2006/0268823 A1* | 11/2006 | Kim | H04W 72/005 370/349 |
| 2013/0308520 A1 | 11/2013 | Damnjanovic et al. | |
| 2014/0301208 A1* | 10/2014 | Merlin | H04L 1/0029 370/236 |
| 2014/0334387 A1 | 11/2014 | Doppler et al. | |
| 2014/0349663 A1 | 11/2014 | Shu | |
| 2016/0183161 A1* | 6/2016 | Jeong | H04W 8/26 370/315 |
| 2016/0226922 A1* | 8/2016 | Russell | H04L 65/1016 |
| 2019/0208502 A1 | 7/2019 | Du et al. | |

FOREIGN PATENT DOCUMENTS

| | | |
|---|---|---|
| CN | 103987090 A | 8/2014 |
| CN | 104285477 A | 1/2015 |
| CN | 104684042 A | 6/2015 |
| WO | 2014110361 A1 | 7/2014 |
| WO | 2018000385 A1 | 1/2018 |

OTHER PUBLICATIONS

IEEE 802.11-2012 Part 11: Wireless LAN Medium Access Control (MAC) and Physical Layer (PHY) Specifications, IEEE Computer Society, Mar. 29, 2012, 2793 pages.

* cited by examiner

STATION RELAY METHOD, APPARATUS, AND SYSTEM

CROSS-REFERENCE TO RELATED APPLICATIONS

This application is a national stage of International Application No. PCT/CN2016/088021, filed on Jun. 30, 2016, which is hereby incorporated by reference in its entirety.

TECHNICAL FIELD

This application relates to the communications field, and in particular, to a station relay method, an apparatus, and a system.

BACKGROUND

The Institute of Electrical and Electronics Engineers (IEEE for short) 802.11 standard organization plans to formulate an Internet-of-Things (IoT for short) standard based on Wireless Fidelity (Wi-Fi for short) of a 2.4 GHz or 5 GHz frequency band, and basic features thereof are as follows: A station (STA for short) consumes less power, and an access point (AP for short) and the station can perform long-distance transmission between each other. For example, an expected transmission radius may reach 2 km, and long-distance transmission is mainly applied to a sensor network scenario, an industrial control scenario, or other scenarios. Specifically, a station may function as a relay. In other words, a relay station (relay STA) is used to implement the long-distance transmission between the access point and the station. For example, the relay station may be a device such as a sensor. In addition to relaying data for an edge station, the relay station also generates data and transmits data.

In an infrastructure (Infrastructure) wireless network, station power consumption has a near-far effect. Assuming that all stations have an equal initial quantity of electricity and an equal amount of to-be-transmitted data, after a period of time, a station that is more distant from an access point consumes more power than a station closer to the access point. The near-far effect of the station power consumption causes inconsistent station power consumption speeds. However, station power consumption speeds are expected to be substantially consistent, to facilitate replacement of a same batch of devices. Therefore, a problem of how to determine a station that functions as a relay in a same basic service set (BSS for short) to ensure that all stations have a substantially same power consumption speed urgently needs to be resolved.

SUMMARY

An objective of the present invention is to provide a station relay method, an apparatus, and a system, so that all stations in a basic service set have a substantially same power consumption speed.

The foregoing objective and other objectives are achieved based on characteristics in independent claims. Further implementations are embodied in dependent claims, the specification, and accompanying drawings.

According to a first aspect, a station relay method is provided. The station relay method includes:

A basic service set includes one access point, at least two type-1 stations, and at least one type-2 station. The basic service set to which the access point belongs includes at least one station group. Each station group includes at least two type-1 stations and at least one type-2 station. The type-2 station is a station that needs to communicate with the access point by using the type-1 station. The type-1 station remains in an active state in a corresponding available time window and functions as a relay station for communication between the access point and the type-2 station.

First, the access point determines, based on remaining quantities of electricity and/or location information of all stations in the at least one station group in the basic service set, identifiers of the type-1 stations in each of the at least one station group and available time window information that corresponds to each type-1 station, and generates a notification message. The notification message includes relay enabling information of the at least one station group. Relay enabling information of each station group includes the identifiers of the at least two type-1 stations in the station group and the available time window information of each type-1 station. The available time window information is used to indicate a time period of an available time window. Subsequently, the access point broadcasts the notification message in the basic service set, so that after receiving the notification message, the type-1 station determines, based on the identifiers of the type-1 stations and the available time window information, a time period of the available time window in which the type-1 station functions as the relay station, and/or so that after receiving the notification message, the type-2 station determines, based on the identifiers of the type-1 stations and the available time window information, a relay station that can be used by the type-2 station.

In the station relay method according to the first aspect, first, the access point determines, based on the remaining quantities of electricity and/or the location information of all the stations in the at least one station group in the basic service set, the identifiers of the type-1 stations in each of the at least one station group and the available time window information that corresponds to each type-1 station, generates the notification message, and then broadcasts, to all stations in the basic service set by using the notification message, at least two type-1 stations that are included in each station group, that can remain in the active state in corresponding available time windows, and that function as relay stations for communication between the access point and the type-2 station, so that after receiving the notification message, the type-1 station determines, based on the identifiers of the type-1 stations and the available time window information, a start moment of the available time window in which the type-1 station functions as the relay station and a length of the available time window, and/or so that after receiving the notification message, the type-2 station determines, based on the identifiers of the type-1 stations and the available time window information, the relay station that can be used. Therefore, the station that needs to communicate with the access point by using the relay station can select different type-1 stations as relay stations in different time periods, so that all the stations in the basic service set have a substantially same power consumption speed.

The time period of the available time window usually may be identified by using a window start moment and a window duration. However, for different cases, there are different specific indication manners. The time period of the available time window includes the following specific descriptions.

In a first implementable manner of the first aspect, a start moment of the time period of the available time window of each type-1 station is determined based on a ranking of the identifier of the type-1 station in the relay enabling information. In this way, the start moment of the time period of the available time window of each type-1 station does not need to be explicitly indicated, thereby reducing indication overheads.

With reference to the first aspect or the first implementable manner of the first aspect, in a second implementable manner of the first aspect, each piece of relay enabling information includes a first start moment. The first start moment is used to indicate a start moment of a time period of an available time window of a first type-1 station in the relay enabling information. The start moment of the time period of the available time window of each type-1 station can be determined based on the first start moment in combination with a ranking of the type-1 station in the relay enabling information. The relay enabling information corresponding to each station group may include a different first start moment. In other words, relay stations of different station groups may run at different start moments. Therefore, there is a flexible indication feature.

Alternatively, the notification message includes a second start moment, and a start moment of a time period of an available time window of a first type-1 station in each piece of relay enabling information is the same as the second start moment. The start moment of the time period of the available time window of each type-1 station can be determined based on the second start moment in combination with the ranking of the type-1 station in the relay enabling information. Because the relay stations of all the station groups run at a same start moment, that is, there is only one second start moment, the indication overheads are relatively low.

With reference to any one of the first aspect, or the first implementable manner of the first aspect and the second implementable manner of the first aspect, in a third implementable manner of the first aspect, each piece of relay enabling information includes a first duration. A length of the time period of the available time window of the type-1 station included in each piece of relay enabling information is the same as the first duration included in the relay enabling information to which the type-1 station belongs. The relay enabling information corresponding to each station group includes one first duration, and first durations included in relay enabling information corresponding to different station groups may be different. In other words, the lengths of the time periods of the available time windows of all the type-1 stations in each station group are the same. Therefore, the indication overheads are reduced. The lengths of the time periods of the available time windows of type-1 stations in the different station groups may be different. This is flexible.

Alternatively, the notification message includes a second duration, and a length of the time period of the available time window of the type-1 station included in each piece of relay enabling information is the second duration. In other words, the notification message includes only one second duration, making the indication overheads lower. This means that all the type-1 stations in all the station groups have the same length of the time period of the available time window.

With reference to any one of the first aspect, or the first implementable manner of the first aspect and the second implementable manner of the first aspect, in a fourth implementable manner of the first aspect, a length of the time period of the available time window of each type-1 station is a preset same length. Because the length of the time period of the available time window is preset, the notification message does not need to explicitly carry the length, thereby further reducing the indication overheads of the notification message.

With reference to any one of the first aspect, or the first implementable manner of the first aspect to the fourth implementable manner of the first aspect, in a fifth implementable manner of the first aspect, each piece of relay enabling information further includes a third duration. The third duration is used to indicate a time interval between available time windows of two type-1 stations that are adjacent in rankings in the relay enabling information. The relay enabling information corresponding to each station group includes one third duration, and third durations included in relay enabling information corresponding to different station groups may be different. In other words, intervals between available time windows of type-1 stations that are adjacent in rankings in the station groups are the same. Therefore, the indication overheads are reduced. The intervals between the available time windows of type-1 stations that are adjacent in rankings in the different station groups may be different. This is flexible.

Alternatively, the notification message further includes a fourth duration. The fourth duration is used to indicate that a time interval between available time windows of two type-1 stations that are adjacent in rankings in each piece of relay enabling information is the fourth duration. The notification message includes only one fourth duration, making the indication overheads lower. This means that the intervals between the available time windows of the type-1 stations that are adjacent in rankings in all the station groups are the same.

With reference to the third implementable manner of the first aspect to the fifth implementable manner of the first aspect, in a sixth implementable manner of the first aspect, each piece of relay enabling information further includes a first duty cycle. The first duty cycle is used to indicate a ratio of the length of the time period of the available time window of the type-1 station in the relay enabling information to the time interval between the available time windows of the two type-1 stations that are adjacent in rankings in the relay enabling information. The relay enabling information corresponding to each station group includes one first duty cycle. In other words, each ratio of the length of the available time window of each type-1 station in each station group to a time interval between a subsequent available time window and the available time window is the same. Therefore, the indication overheads are reduced. First duty cycles included in relay enabling information corresponding to different station groups may be different. This is flexible.

Alternatively, the notification message includes a second duty cycle. A ratio of the length of the time period of the available time window of the type-1 station in each piece of relay enabling information to the time interval between the available time windows of the two type-1 stations that are adjacent in rankings in the relay enabling information is equal to a value of the second duty cycle. The notification message includes only one second duty cycle, making the indication overheads lower. This means that ratios of the lengths of the available time windows of the type-1 stations in all the station groups to the intervals of the windows respectively are the same.

With reference to any one of the first aspect, or the first implementable manner of the first aspect to the fourth implementable manner of the first aspect, in a seventh implementable manner of the first aspect, each piece of relay enabling information further includes a time interval between available time windows respectively corresponding to each type-1 station in the relay enabling information and a type-1 station that ranks adjacent to the type-1 station in the relay enabling information. Each time interval between available time windows respectively corresponding to any two type-1 stations that are adjacent in rankings in the relay enabling information may be the same or may be different. In this case, the interval between the available time windows of the two type-1 stations that are adjacent in rankings in each piece of relay enabling information is allowed to be separately indicated. The access point may adjust, as required, the interval between the available time windows of the two type-1 stations that are adjacent in rankings in each piece of relay enabling information. Therefore, the indication manner is more flexible.

With reference to any one of the first aspect, or the first implementable manner of the first aspect to the seventh implementable manner of the first aspect, in an eighth implementable manner of the first aspect, each piece of relay enabling information further includes a first time cycle. The first time cycle is used to indicate a time period in which the available time window information of the at least two type-1 stations included in the relay enabling information remains valid.

Alternatively, the notification message includes a second time cycle, and the second time cycle is used to indicate a time period in which the available time window information of all the type-1 stations in the basic service set remains valid.

Alternatively, the access point sends the first time cycle or the second time cycle to each type-1 station in the basic service set by using a management frame.

With reference to any one of the first aspect, or the first implementable manner of the first aspect to the eighth implementable manner of the first aspect, in a ninth implementable manner of the first aspect, at any moment in the first time cycle or the second time cycle, coverage of a type-1 station that remains in the active state and that functions as a relay station for communication between the access point and the type-2 station is capable of covering all the type-2 stations.

With reference to the eighth implementable manner of the first aspect or the ninth implementable manner of the first aspect, in a tenth implementable manner of the first aspect, each piece of relay enabling information further includes a quantity of first time cycles; or the notification message further includes a quantity of second time cycles.

With reference to any one of the first aspect, or the first implementable manner of the first aspect to the tenth implementable manner of the first aspect, in an eleventh implementable manner of the first aspect, before the generating, by the access point, a notification message based on remaining quantities of electricity and/or location information of all stations in the at least one station group, the method further includes: receiving, by the access point, an uplink message sent by each station in the at least one station group, where the uplink message includes a remaining quantity of electricity of the station.

With reference to the eleventh implementable manner of the first aspect, in a twelfth implementable manner of the first aspect, after the receiving, by the access point, an uplink message sent by each station in the at least one station group, the method further includes: estimating, by the access point, location information of the station based on the uplink message of the station.

With reference to the eleventh implementable manner of the first aspect, in a thirteenth implementable manner of the first aspect, the uplink message of the station further includes location information of the station that is estimated by the station based on a downlink message sent by the access point to the station.

With reference to any one of the first aspect, or the first implementable manner of the first aspect to the thirteenth implementable manner of the first aspect, in a fourteenth implementable manner of the first aspect, after the broadcasting, by the access point, the notification message in the basic service set, the method further includes: determining, by the access point, at least one relay station related to a target edge station; and sending, by the access point, data to the target edge station by using the at least one relay station. Each station group includes an edge station, to be specific, a station that is distant from the access point and that needs to communicate with the access point by using a relay station, that is, the type-2 station. The target edge station is one of the type-2 stations. The relay station is the type-1 station.

According to a second aspect, a station relay method is provided. The station relay method includes:

A basic service set includes one access point, at least two type-1 stations, and at least one type-2 station. The basic service set includes at least one station group. Each station group includes at least two type-1 stations and at least one type-2 station. The type-1 station remains in an active state in a corresponding available time window and functions as a relay station for communication between the access point and the type-2 station. The type-2 station is a station that needs to communicate with the access point by using the type-1 station. First, a station in the basic service set receives a notification message. The notification message includes relay enabling information of at least one station group. Relay enabling information of each station group includes identifiers of at least two type-1 stations in the station group and available time window information of each type-1 station. The available time window information is used to indicate a time period of an available time window. Subsequently, when an identifier of the station is not included in the notification message and the station needs to communicate with the access point by using a relay station, the station determines, based on the identifiers of the at least two type-1 stations and the available time window information, at least one type-1 station as an available relay station.

In the station relay method according to the second aspect, after the station in the basic service set receives the notification message that is broadcast by the access point and that includes the at least two type-1 stations that can remain in the active state in the corresponding available time windows and that function as relay stations for communication between the access point and the type-2 station, when the station determines that the identifier of the station is not included in the notification message and the station needs to communicate with the access point by using the relay station, the station determines, based on the identifiers of the at least two type-1 stations and the available time window information, at least one type-1 station as an available relay station. Therefore, the station that needs to communicate with the access point by using the relay station can select different type-1 stations as relay stations in different time periods, so that all stations in the basic service set have a substantially same power consumption speed.

In a first implementable manner of the second aspect, after the determining, by the station based on the identifiers of the at least two type-1 stations and the available time window information, at least one type-1 station as an available relay station, the method further includes: selecting, by the station, one relay station from the at least one type-1 station; and sending, by the station, data to the relay station.

According to a third aspect, a station relay method is provided. The station relay method includes:

A basic service set includes one access point, at least two type-1 stations, and at least one type-2 station. The basic service set includes at least one station group. Each station group includes at least two type-1 stations and at least one type-2 station. The type-1 station remains in an active state in a corresponding available time window and functions as a relay station for communication between the access point and the type-2 station. The type-2 station is a station that needs to communicate with the access point by using the type-1 station. First, a station in the basic service set receives a notification message broadcast by an access point. The notification message includes relay enabling information of at least one station group. Relay enabling information of each station group includes identifiers of at least two type-1 stations in the station group and available time window information of each type-1 station. The available time window information is used to indicate a time period of an available time window. Subsequently, when an identifier of the station matches one of the identifiers of the at least two type-1 stations included in the notification message, the station determines, based on the identifiers of the type-1 stations and the available time window information, a start moment of the available time window in which the type-1 station functions as the relay station and a length of the available time window.

In the station relay method according to the third aspect, after the station in the basic service set receives the notification message that is broadcast by the access point and that includes the at least two type-1 stations that can remain in the active state in the corresponding available time windows and that function as relay stations for communication between the access point and the type-2 station, when the station determines that the identifier of the station matches one of the identifiers of the at least two type-1 stations included in the notification message, the station determines the start moment of the available time window in which the station is used as the relay station and the length of the available time window. Therefore, the station that needs to communicate with the access point by using the relay station can select different type-1 stations as relay stations in different time periods, so that all stations in the basic service set have a substantially same power consumption speed.

In a first implementable manner of the third aspect, after the receiving, by a station, a notification message broadcast by an access point, the method further includes: forwarding, by the station, the notification message.

According to a fourth aspect, an access point is provided. A basic service set to which the access point belongs includes at least one station group. Each station group includes at least two type-1 stations and at least one type-2 station. The type-2 station is a station that needs to communicate with the access point by using the type-1 station. The access point includes: a generation unit, configured to: determine, based on remaining quantities of electricity and/or location information of all stations in the at least one station group in the basic service set, identifiers of the type-1 stations in each of the at least one station group and available time window information that corresponds to each type-1 station, and generate a notification message, where the notification message includes relay enabling information of the at least one station group, relay enabling information of each station group includes the identifiers of the at least two type-1 stations in the station group and the available time window information of each type-1 station, the available time window information is used to indicate a time period of an available time window, each type-1 station remains in an active state in a corresponding available time window and functions as a relay station for communication between the access point and the type-2 station, the access point, the type-2 station, and all the type-1 stations belong to the same basic service set, the basic service set includes the at least one station group, each station group includes the at least two type-1 stations and the at least one type-2 station, and the type-2 station is a station that needs to communicate with the access point by using the type-1 station; and a sending unit, configured to broadcast, in the basic service set, the notification message generated by the generation unit, so that after receiving the notification message, the type-1 station determines, based on the identifiers of the type-1 stations and the available time window information, a time period of the available time window in which the type-1 station functions as the relay station, and/or so that after receiving the notification message, the type-2 station determines, based on the identifiers of the type-1 stations and the available time window information, a relay station that can be used by the type-2 station. For a specific implementation, refer to the function of behavior of the access point in the station relay method according to the first aspect.

According to a fifth aspect, a station is provided. The station includes: a receiving unit, configured to receive a notification message, where the notification message includes relay enabling information of at least one station group, relay enabling information of each station group includes identifiers of at least two type-1 stations in the station group and available time window information of each type-1 station, the available time window information is used to indicate a time period of an available time window, each type-1 station remains in an active state in a corresponding available time window and functions as a relay station for communication between an access point and a type-2 station, the access point, the type-2 station, and all the type-1 stations belong to a same basic service set, the basic service set includes at least one station group, each station group includes the at least two type-1 stations and at least one type-2 station, and the type-2 station is a station that needs to communicate with the access point by using the type-1 station; and a processing unit, configured to: when an identifier of the station is not included in the notification message and the station needs to communicate with the access point by using a relay station, determine, based on the identifiers of the at least two type-1 stations and the available time window information, at least one type-1 station as an available relay station. For a specific implementation, refer to the function of behavior of the station in the station relay method according to the second aspect.

According to a sixth aspect, a station is provided. The station includes: a receiving unit, configured to receive a notification message broadcast by an access point, where the notification message includes relay enabling information of at least one station group, relay enabling information of each station group includes identifiers of at least two type-1 stations in the station group and available time window information of each type-1 station, the available time window information is used to indicate a time period of an available time window, each type-1 station remains in an active state in a corresponding available time window and functions as a relay station for communication between the access point and a type-2 station, the access point, the type-2 station, and all the type-1 stations belong to a same basic service set, the basic service set includes at least one station group, each station group includes the at least two type-1 stations and at least one type-2 station, and the type-2 station is a station that needs to communicate with the access point by using the type-1 station; and a processing unit, configured to: when an identifier of the station matches one of the identifiers of the at least two type-1 stations included in the notification message, determine, based on the identifiers of the type-1 stations and the available time window information, a time period of an available time window in which the station is used as a relay station. For a specific implementation, refer to the function of behavior of the station in the station relay method according to the third aspect.

It should be noted that the function modules according to the fourth aspect to the sixth aspect may be implemented by using hardware, or may be implemented by using hardware executing corresponding software. The hardware or software includes one or more modules corresponding to the foregoing functions. For example, a communications interface is configured to implement the functions of the receiving unit and the sending unit, a processor is configured to implement the function of the processing unit, and a memory is configured to store a volume threshold. The processor, the communications interface, and the memory are connected to and communicate with each other by using a bus. For details, refer to the function of behavior of the access point in the station relay method according to the first aspect, and the function of behavior of the station in the station relay method according to the second aspect and the third aspect.

According to the station relay method and device according to the foregoing aspects, the access point determines, based on the remaining quantities of electricity and/or the location information of all the stations in the at least one station group in the basic service set, the identifiers of the type-1 stations in each of the at least one station group and the available time window information that corresponds to each type-1 station, generates the notification message, and then broadcasts, to all the stations in the basic service set by using the notification message, the at least two type-1 stations that are included in each station group, that can remain in the active state in the corresponding available time windows, and that function as relay stations for communication between the access point and the type-2 station, so that after receiving the notification message, the type-1 station determines, based on the identifiers of the type-1 stations and the available time window information, the start moment of the available time window in which the type-1 station functions as the relay station and the length of the available time window, and/or so that after receiving the notification message, the type-2 station determines, based on the identifiers of the type-1 stations and the available time window information, the relay station that can be used. Therefore, the station that needs to communicate with the access point by using the relay station can select different type-1 stations as relay stations in different time periods, so that all the stations in the basic service set have a substantially same power consumption speed.

In the present invention, names of the access point and the station do not constitute a limitation on the devices themselves. In actual implementation, these devices may have other names, provided that functions of the devices are similar to those in the present invention and fall within the scope defined by the following claims and equivalent technologies of the present invention.

These aspects or other aspects of the present invention are more concise and understandable in the description of the following embodiments.

BRIEF DESCRIPTION OF THE DRAWINGS

To describe the technical solutions in the embodiments of this application or in the prior art more clearly, the following briefly describes the accompanying drawings required for describing the embodiments or the prior art. Apparently, the accompanying drawings in the following description show some embodiments of this application, and a person of ordinary skill in the art may still derive other drawings from these accompanying drawings without creative efforts.

DETAILED DESCRIPTION OF ILLUSTRATIVE EMBODIMENTS

Figure 1:
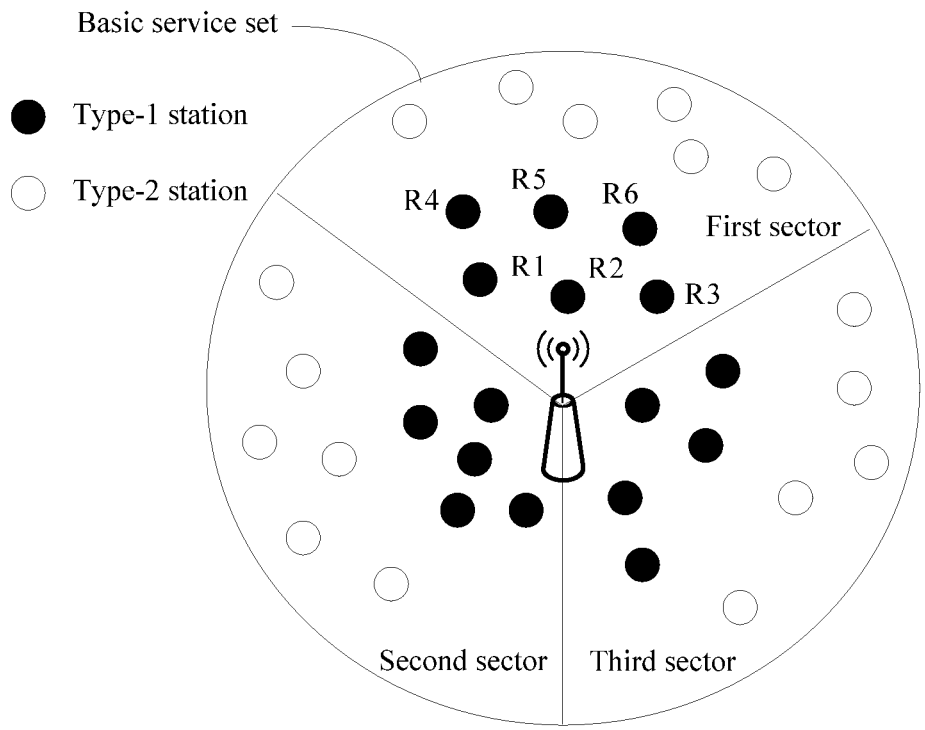
FIG. 1 is a schematic diagram of a communications system according to an embodiment of this application.

The following clearly describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

Data transmission between a station and an access point needs forwarding by a relay. On the one hand, the station and the access point cannot be one-hop reachable because there is a relatively long distance between the access point and the station. On the other hand, even if the station and the access point are one-hop reachable, because the distance between the station and the access point is relatively long, the station consumes power quickly if the station directly transmits data to the access point. However, if a relay is used to forward the data sent by the station, power can be effectively saved.

A basic principle of the present invention is as follows: An access point determines, based on remaining quantities of electricity and/or location information of all stations in at least one station group in a basic service set, an identifier of a type-1 station in each of the at least one station group and available time window information that corresponds to each type-1 station, and generates a notification message. The notification message is broadcast to all stations included in the basic service set, so that after receiving the notification message, the type-1 station determines, based on the identifier of the type-1 station and the available time window information, a start moment of an available time window in which the type-1 station functions as a relay station, and/or so that after receiving the notification message, a type-2 station determines, based on the identifier of the type-1 station and the available time window information, a relay station that can be used by the type-2 station. Each type-1 station remains in an active state in a corresponding available time window and functions as a relay station for communication between the access point and the type-2 station. The type-2 station is a station that needs to communicate with the access point by using the type-1 station. Therefore, the station that needs to communicate with the access point by using the relay station can select different type-1 stations as relay stations in different time periods, so that all stations in the basic service set have a substantially same power consumption speed.

Embodiments of the present invention are described in detail in the following with reference to the accompanying drawings.

It should be noted that, to clearly describe the technical solutions of the embodiments of the present invention, in the embodiments of the present invention, the terms "first", "second", and the like are used to distinguish same items or similar items whose functions and functions are basically the same, and a person skilled in the art may understand that the terms "first" "second", and the like do not limit a quantity and an execution order.

An embodiment of the present invention provides a schematic diagram of a communications system. As shown in FIG. 1, the communications system includes an access point and a station that belong to a same basic service set. The basic service set may include a plurality of different sectors, for example, a first sector, a second sector, and a third sector. Each sector includes a plurality of stations. In other words, each sector may be considered as a station group. The stations included in each sector may communicate with the access point, or may communicate with a station in another sector by using the access point.

Figure 2:
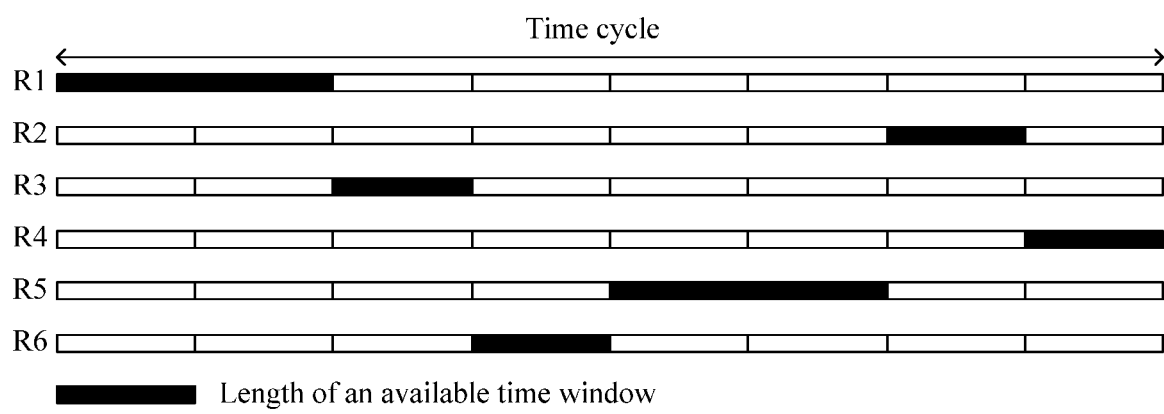
FIG. 2 is a schematic diagram of a length of an available time window according to an embodiment of this application.

For example, as shown in FIG. 1, for the first sector of the basic service set, the access point may determine that six stations R1 to R6 that are located relatively close to the access point are type-1 stations, and other stations located at sector edges and relatively distant from the access point are type-2 stations. As shown in FIG. 2, an example of a time period of an available time window of each type-1 station is presented. The six type-1 stations function as relay stations in a time division manner shown in FIG. 2. In this way, a type-2 station in the sector that needs to communicate with the access point by using a relay station may deduce, based on identifiers of the type-1 stations, available time window information, and a current system time, a station that currently functions as a relay. There may be a plurality of candidate relay stations for one type-2 STA, and these relay stations work in different time periods. In this way, it can be maximally ensured that the type-2 STA can find at least one available relay station almost at any moment. Information about a rule of working in different time periods by relay stations is added to a notification message, and the notification message is broadcast by the AP and may be further forwarded to an entire network by the relay station. That the relay stations work in different time periods ensures power saving of the relay stations. Preferably, addition of the time periods can cover an entire time period. This can ensure that the type-2 STA can find an available relay station at any moment.

It should be noted that the sector herein is a concept introduced to facilitate descriptions of a solution of the present invention and is not a sector obtained through division based on an antenna coverage direction. In each sector, there needs to be only one active relay device at any moment to cover all type-2 stations in the sector. From a perspective of the entire basic service set, there are usually a plurality of active relay stations at a same moment, and these active relay stations are for stations of different sectors. A combination of the plurality of active relay stations existing at the same time can cover all the type-2 stations in the entire BSS.

Figure 3:
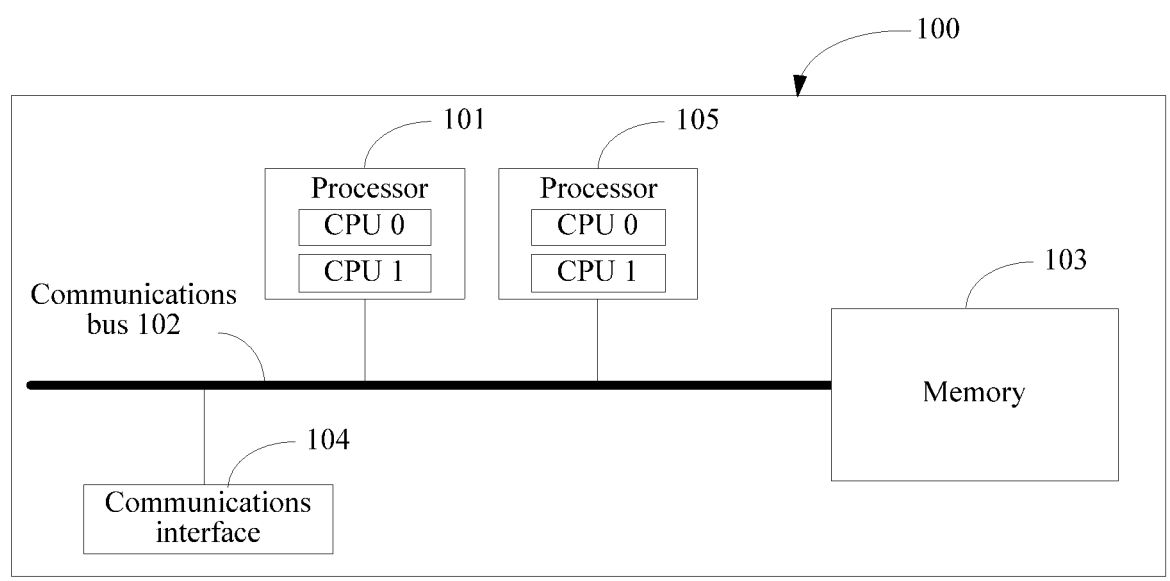
FIG. 3 is a schematic structural diagram of a computer device according to an embodiment of this application.

As shown in FIG. 3, the access point and the station in FIG. 1 may be implemented in a form of a computer device (or system) in FIG. 3.

FIG. 3 is a schematic diagram of a computer device according to an embodiment of the present invention. The computer device 100 includes at least one processor 101, a communications bus 102, a memory 103, and at least one communications interface 104.

The processor 101 may be one processor, or may be a general term of a plurality of processing elements. For example, the processor 101 may be a general purpose central processing unit (CPU for short), or may be an application-specific integrated circuit (ASIC for short), or one or more integrated circuits configured to control execution of a program in this solution of the present invention, for example, one or more microprocessors (DSP for short), or one or more field programmable gate arrays (FPGA for short).

In a specific implementation, in an embodiment, the processor 101 may include one or more CPUs, for example, a CPU 0 and a CPU 1 shown in FIG. 3.

In a specific implementation, in an embodiment, the computer device 100 may include a plurality of processors, for example, a processor 101 and a processor 105 shown in FIG. 3. Each of these processors may be a single-core (single-CPU) processor, or may be a multi-core (multi-CPU) processor. The processors herein may refer to one or more devices, circuits, and/or processing cores configured to process data (for example, a computer program instruction).

The communications bus 102 may be an industry standard architecture (ISA for short) bus, a peripheral component interconnect (PCI for short) bus, an extended industry standard architecture (EISA for short) bus, or the like. The bus may include an address bus, a data bus, a control bus, and the like. For ease of indication, the bus is indicated by using only one bold line in FIG. 3. However, it does not indicate that there is only one bus or only one type of bus.

The memory 103 may be a read-only memory (ROM for short) or another type of static storage device capable of storing static information and instructions, a random access memory (RAM for short) or another type of dynamic storage device capable of storing information and instructions, or may be an electrically erasable programmable read-only memory (EEPROM for short), a compact disc read-only memory (CD-ROM for short), or other compact disc storage or optical disc storage (including a compressed optical disc, a laser disc, an optical disc, a digital universal optical disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently and is connected to the processor by using the bus. Alternatively, the memory may be integrated with the processor.

The memory 103 is configured to store application program code for performing this solution of the present invention, and the processor 101 controls the performing. The processor 101 is configured to execute the application program code stored in the memory 103.

The communications interface 104 may be any apparatus that uses a transceiver, and is configured to communicate with another device or a communications network, for example, the Ethernet, a radio access network (RAN), or a wireless local area network (WLAN for short). The communications interface 104 may include a receiving unit for implementing a receiving function and a sending unit for implementing a sending function.

In a specific implementation, in an embodiment, the computer device 100 shown in FIG. 3 may be the access point in FIG. 1.

The processor 101 is configured to generate a notification message.

The processor 101 is further configured to estimate a location of a station based on an uplink message of the station.

The communications interface 104 is configured to broadcast the notification message in a basic service set.

The communications interface 104 is further configured to receive an uplink message sent by each station in the basic service set. The uplink message includes a remaining quantity of electricity of the station.

The memory 103 is configured to store identifiers that are of at least two type-1 stations and that are determined by the access point and available time window information of an available time window in which each type-1 station is used as a relay station.

In a specific implementation, in an embodiment, the computer device 100 shown in FIG. 3 may be the station in FIG. 1.

The communications interface 104 is configured to receive a notification message broadcast by the access point.

The communications interface 104 is further configured to forward the notification message.

The processor 101 is configured to: when an identifier of the station matches one of the identifiers of the at least two type-1 stations included in the notification message, determine, based on identifiers of the type-1 stations and the available time window information, a start moment of the available time window in which the type-1 station functions as the relay station and a length of the available time window.

The processor 101 is further configured to: when the station needs to communicate with the access point by using a relay station, determine, based on the identifiers of the at least two type-1 stations and the available time window information, at least one type-1 station as an available relay station.

Embodiment 1

Figure 4:
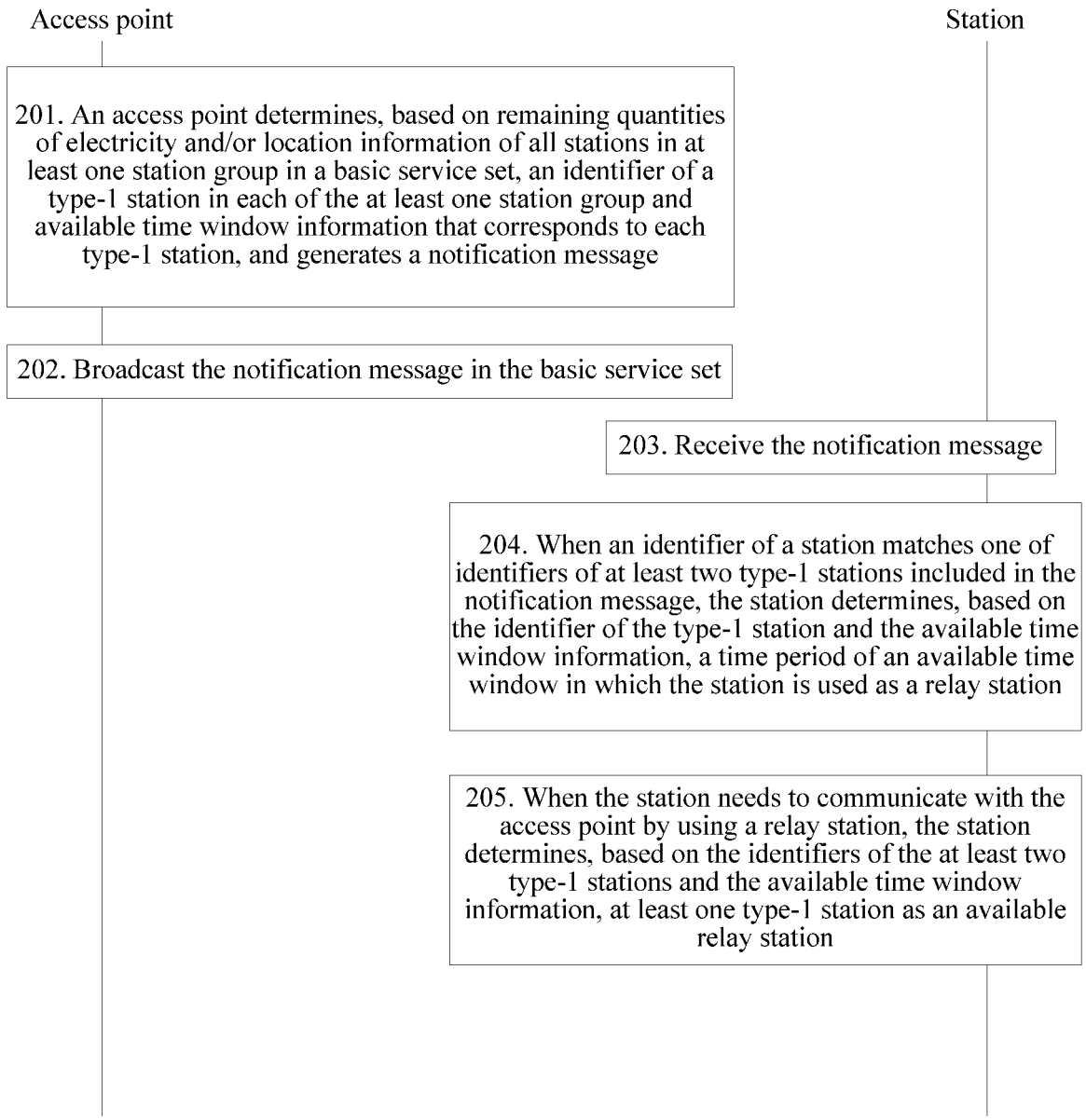
FIG. 4 is a flowchart of a station relay method according to an embodiment of this application.

This embodiment of the present invention provides a station relay method. As shown in FIG. 4, the station relay method includes the following steps.

Step 201. An access point determines, based on remaining quantities of electricity and/or location information of all stations in at least one station group in a basic service set, an identifier of the type-1 station in each of the at least one station group and available time window information that corresponds to each type-1 station, and generates a notification message.

The access point generates the notification message to determine the type-1 station, and configures an available time window of the type-1 station. This action may be performed for one or more station groups, and is not necessarily performed for the entire basic service set. In this case, that the access point generates the notification message needs to be determined based only on remaining quantities of electricity and/or location information of all stations in one or more corresponding station groups, and other stations in the basic service set do not need to be considered. In this way, the access point may separately adjust and control quantities of electricity of station groups in a plurality of times for one basic service set, so that all stations in the entire basic service set can have a substantially same power consumption speed. Certainly, this action may alternatively be performed for the entire basic service set. In this case, the access point may determine, based on remaining quantities of electricity and/or location information of all stations in the entire basic service set, the identifier of the type-1 station in each of the station groups included in the basic service set and the available time window information that corresponds to each type-1 station.

The notification message includes relay enabling information of the at least one station group. Relay enabling information of each station group includes identifiers of at least two type-1 stations in the station group and the available time window information of an available time window in which each type-1 station is used as a relay station. The available time window information is used to indicate a time period of the available time window. A basic service set includes one access point, at least two type-1 stations, and at least one type-2 station. The basic service set includes at least one station group. Each station group includes at least two type-1 stations and at least one type-2 station. The type-1 station remains in an active state in a corresponding available time window and functions as a relay station for communication between the access point and the type-2 station. The type-2 station is a station that needs to communicate with the access point by using the type-1 station.

Specifically, the access point determines the identifiers of the at least two type-1 stations based on the remaining quantities of electricity and/or the location information of all the stations in the basic service set, and generates the notification message. Because a station power consumption speed has a near-far effect, if a station closer to the access point is used as a relay device, power consumption speeds of near and far stations can be effectively balanced. A station with a larger remaining quantity of electricity and closer to the access point has more opportunities to become a type-1 station. For example, the access point selects a device whose remaining quantity of electricity is greater than a first threshold and whose distance from the access point is less than a second threshold as a type-1 station. Certainly, being excessively close to the access point may be disadvantageous for an edge station to save power. Therefore, a station being excessively close to the access point may not be suitable to be used as a type-1 station. To be specific, a distance between a type-1 station selected by the access point as a relay and the access point may need to be greater than a third threshold. Lengths that are of available time windows of type-1 stations and that are indicated by the access point in the notification message are also determined based on remaining quantities of electricity and/or location information of the type-1 stations. For a plurality of type-1 stations having a same distance from the access point, a larger remaining quantity of electricity indicates a larger length of an available time window. For a plurality of type-1 stations having a same remaining quantity of electricity, a shorter distance from the access point indicates a larger length of an available time window. The access point determines stations that are closer to the access point and that have larger remaining quantities of electricity as relay devices. This increases power consumption speeds of these stations. In addition, a power consumption speed of an edge station is reduced because of existence of these relay devices, thereby making the stations in the entire basic service set have a substantially same power consumption speed.

It should be noted that the access point may determine, for each station group, the identifiers of the type-1 stations in the station group and the available time window information of the type-1 stations of the station group. The stations of each station group may perform specific steps based on the following descriptions. The station group may be a group obtained by dividing, based on locations, stations associated with the access point by the access point internally, to facilitate separate indication of available time window information for different station groups, thereby reducing indication overheads. This is because available time windows of type-1 stations in a same station group have a sequential relationship in time. Such a sequential relationship can greatly reduce the indication overheads. However, it should be noted that such a grouping is a division of the associated stations within the access point. These groups may be or may not be explicitly indicated in the notification message. To reduce the indication overheads, preferably, the groups are explicitly indicated. To be specific, the identifiers of the type-1 stations included in the notification message are divided into a plurality of groups, and each group corresponds to one station group. Certainly, the access point may alternatively separately indicate available time window information of each type-1 station in the notification message, without paying particular attention to the sequential relationship in time between available time windows of different type-1 stations. In this case, the stations of the entire basic service set may be considered as one station group. Indication overheads of this method are higher than those of a method for explicitly indicating a station group.

The time period of the available time window usually may be identified by using a window start moment and a window duration. However, for different cases, there are different specific indication manners.

Optionally, a start moment of the time period of the available time window of each type-1 station is determined based on a ranking of the identifier of the type-1 station in the relay enabling information. The entire basic service set may include a plurality of station groups. Therefore, the notification message may include identifiers of a plurality of groups of type-1 stations. For identifiers of each group of type-1 stations, a start moment of a time period of an available time window of each type-1 station is determined based on a ranking of an identifier of the type-1 station in the identifiers of the group of type-1 stations. In this way, the start moment of the time period of the available time window of each type-1 station does not need to be explicitly indicated, thereby reducing indication overheads.

Optionally, each piece of relay enabling information includes a first start moment. The first start moment is used to indicate a start moment of a time period of an available time window of a first type-1 station in the relay enabling information. The first start moments included in all the relay enabling information may be the same or may be different. The start moment of the time period of the available time window of each type-1 station can be determined based on the first start moment in combination with the ranking of the type-1 station in the relay enabling information. The relay enabling information corresponding to each station group may include a different first start moment. In other words, relay stations of different station groups may run at different start moments. Therefore, there is a flexible indication feature.

Alternatively, the notification message includes a second start moment, and a start moment of a time period of an available time window of a first type-1 station in each piece of relay enabling information is the same as the second start moment. The start moment of the time period of the available time window of each type-1 station can be determined based on the second start moment in combination with the ranking of the type-1 station in the relay enabling information. Because the relay stations of all the station groups run at a same start moment, that is, there is only one second start moment, the indication overheads are relatively low.

It should be noted that the first start moment or the second start moment may be indicated by using an absolute time, for example, when a plurality of low-order bits of a timing synchronization function (TSF for short) are equal to the first start moment or the second start moment, the first start moment or the second start moment is reached; or may be indicated by using a relative time, for example, the first start moment or the second start moment is after a period of time after the notification message is completed. The first start moment or the second start moment may not be explicitly indicated in the notification message. For example, a predefined time interval, for example, a short interframe space (SIFS for short), after an end time of the notification message is used as the first start moment or the second start moment by default. Alternatively, the access point indicates the first start moment or the second start moment in a previous management frame, such as a beacon frame (Beacon), a probe response frame (Probe Response), an association response frame (Association Response), or another management frame.

Optionally, each piece of relay enabling information includes a first duration. A length of the time period of the available time window of the type-1 station included in each piece of relay enabling information is the same as the first duration included in the relay enabling information to which the type-1 station belongs. The first durations included in all the relay enabling information may be the same or may be different. The relay enabling information corresponding to each station group includes one first duration, and first durations included in relay enabling information corresponding to different station groups may be different. In other words, the lengths of the time periods of the available time windows of all the type-1 stations in each station group are the same. Therefore, the indication overheads are reduced. The lengths of the time periods of the available time windows of type-1 stations in the different station groups may be different. This is flexible.

Alternatively, the notification message includes a second duration. A length of the time period of the available time window of the type-1 station included in each piece of relay enabling information is the second duration. In other words, the notification message includes only one second duration, making the indication overheads lower. This means that all the type-1 stations in all the station groups have the same length of the time period of the available time window.

It should be noted that the first duration or the second duration may be indicated in the notification message, or the first duration or the second duration may not be explicitly indicated. For example, the first duration or the second duration is defined in a standard, or the first duration or the second duration is indicated by the access point in a previous management frame (such as a beacon, a probe response, or an association response).

Optionally, a length of the time period of the available time window of each type-1 station is a preset same length. Because the length of the time period of the available time window is preset, the notification message does not need to explicitly carry the length, thereby further reducing the indication overheads of the notification message.

Particularly, if the lengths of the time periods of the available time windows of the type-1 stations are not equal, each type-1 station needs one corresponding length indication of the time period of the available time window. In this case, the lengths of all the available time windows need to be explicitly indicated in the notification message.

Optionally, each piece of relay enabling information further includes a third duration. The third duration is used to indicate a time interval between available time windows of two type-1 stations that are adjacent in rankings in the relay enabling information. The third durations included in all the relay enabling information may be the same or may be different. The relay enabling information corresponding to each station group includes one third duration, and third durations included in relay enabling information corresponding to different station groups may be different. In other words, intervals between available time windows of type-1 stations that are adjacent in rankings in the station groups are the same. Therefore, the indication overheads are reduced. The intervals between the available time windows of type-1 stations that are adjacent in rankings in the different station groups may be different. This is flexible.

Alternatively, the notification message further includes a fourth duration. A time interval between available time windows of two type-1 stations that are adjacent in rankings in each piece of relay enabling information is the fourth duration. The notification message includes only one fourth duration, making the indication overheads lower. This means that the intervals between the available time windows of the type-1 stations that are adjacent in rankings in all the station groups are the same.

Optionally, each piece of relay enabling information further includes a first duty cycle. The first duty cycle is used to indicate a ratio of the length of the time period of the available time window of the type-1 station in the relay enabling information to the time interval between the available time windows of the two type-1 stations that are adjacent in rankings in the relay enabling information. The relay enabling information corresponding to each station group includes one first duty cycle. In other words, each ratio of the length of the available time window of each type-1 station in each station group to a time interval between a subsequent available time window and the available time window is the same. Therefore, the indication overheads are reduced. First duty cycles included in relay enabling information corresponding to different station groups may be different. This is flexible.

Alternatively, the notification message includes a second duty cycle. The second duty cycle is used to indicate that a ratio of the length of the time period of the available time window of the type-1 station in each piece of relay enabling information to the time interval between the available time windows of the two type-1 stations that are adjacent in rankings in the relay enabling information is equal to a value of the second duty cycle. In other words, each ratio of a length of a time period of an available time window of each type-1 station in the basic service set to a time interval of a type-1 station that is adjacent to the type-1 station in ranking is the same. The notification message includes only one second duty cycle, making the indication overheads lower. This means that ratios of the lengths of the available time windows of the type-1 stations in all the station groups to the intervals of the windows respectively are the same.

Optionally, each piece of relay enabling information further includes a time interval between each type-1 station in the relay enabling information and a type-1 station that is adjacent to the type-1 station in ranking in the relay enabling information. A time interval between any two type-1 stations in the relay enabling information may be the same or may be different. In this case, the interval between the available time windows of the type-1 stations that are adjacent in rankings in each piece of relay enabling information is allowed to be separately indicated. The access point may adjust, as required, an interval between available time windows of different type-1 stations. Therefore, the indication manner is more flexible.

Based on the foregoing indication, each type-1 station may calculate a start moment of the time period of the available time window. It is assumed that available time windows of N type-1 stations are arranged based on different time periods. If lengths of time periods of the available time windows of the N type-1 stations are equal and there is no interval, a start moment of a time period of an available time window of an $i^{th}$ type-1 station is $t(t_0)+(i-1)\times T$, where i=1, 2, ..., or N, and $t(t_0)$ is the start moment of the available time window of the first type-1 station in the relay enabling information. If the lengths of the time periods of the available time windows of the N type-1 stations are not equal and there is no interval, the start moment of the time period of the available time window of the $i^{th}$ type-1 station is $$t(t_0) + \sum_{k=1}^{i-1} T_k,$$

where $T_k$ is a length of a time period of an available time window of a $k^{th}$ type-1 station in the relay enabling information. If the lengths of the time periods of the available time windows of the N type-1 stations are equal, and an interval between an end of the available time window of the $i^{th}$ type-1 station and a start location of an available time window of a next type-1 station is $T_i'$, the start moment of the time period of the available time window of the $i^{th}$ type-1 station is $$t(t_0) + (i-1)\times T + \sum_{k=1}^{i-1} T_k',$$

and so on. A station may calculate the start moment of the time period of the available time window of each type-1 station by using a same method. In the foregoing descriptions, i represents an order of the identifiers of the type-1 stations in the relay enabling information. In other words, the start moment of the time period of the available time window of each type-1 station is determined based on a ranking of the identifier of the type-1 station in the relay enabling information.

Optionally, each piece of relay enabling information further includes a first time cycle, and the first time cycle is used to indicate a time period in which the available time window information of the at least two type-1 stations included in the relay enabling information remains valid.

Alternatively, the notification message includes a second time cycle, and the second time cycle is used to indicate a time period in which the available time window information of all the type-1 stations in the basic service set remains valid.

Alternatively, the access point sends the first time cycle or the second time cycle to each type-1 station in the basic service set by using a management frame. The management frame is sent before the notification message is sent, and may be specifically an association response frame or another management frame.

It should be noted that the available time window may be cyclic or non-cyclic. For a cyclic available time window, a type-1 station is cyclically in relay mode based on information in the notification message by using a time cycle as a cycle. In this case, the access point may need to indicate a quantity (namely, a quantity of time cycles, where for example, a total of M time cycles are performed) of cycles performed in this process, and the quantity of cycles may be included in the notification message. Alternatively, for a non-cyclic available time window, a station wakes up when a time cycle ends, and listens to new notification information of the access point.

Optionally, at any moment in the first time cycle or the second time cycle, coverage of the type-1 station that remains in the active state and that functions as the relay station for communication between the access point and the type-2 station can cover all type-2 stations. From a perspective of any sector (namely, a station group), at least one type-1 station is in the active state and functions as a relay at any moment. From a perspective of the entire BSS, a communication range of a type-1 station that is in the active state and that functions as a relay at any moment can cover all type-2 stations in the BSS. In conclusion, any type-2 station can find, at any moment, at least one type-1 station that is in the active state and that functions as a relay, to complete uplink data transmission with the access point by using the at least one type-1 station. Conversely, the access point can find, at any moment, at least one type-1 station that is in the active state and that functions as a relay, to complete downlink data transmission with any type-2 station in this BSS by using the at least one type-1 station. Because the type-2 station is usually located at an edge of the basic service set and is distant from the access point, the type-2 station is also referred to as an edge station.

Figure 5:
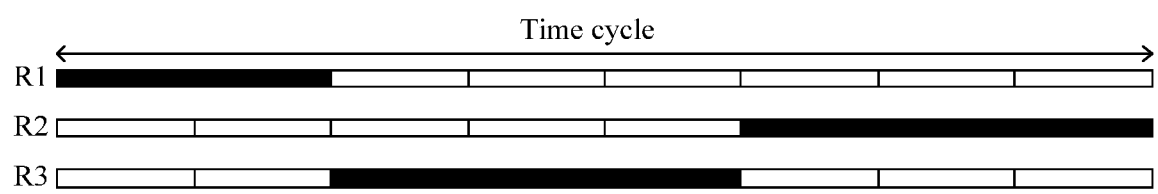
FIG. 5 is a schematic diagram of a length of another available time window according to an embodiment of this application.

For example, the station may need to send data to the access point by using a relay at any time. In this case, any station needs to be capable of finding at least one available type-1 station at any time. For example, in a forest fire monitoring network, an occurrence time of a fire is uncertain. Therefore, a sensor should be capable of uploading data at any time. In such a scenario, a design of the type-1 station not only needs to maintain a same power consumption speed as the type-2 station, but also needs to ensure that any type-2 station can find an available type-1 station at any time. Therefore, for any type-2 station in the basic service set, addition of time periods of available time windows of type-1 stations located close to the type-2 station (or in other words, capable of directly communicating with the type-2 station) should be capable of covering the entire time cycle (Time circle), as shown in FIG. 5. Actually, available time windows of different type-1 stations may overlap.

Figure 6:
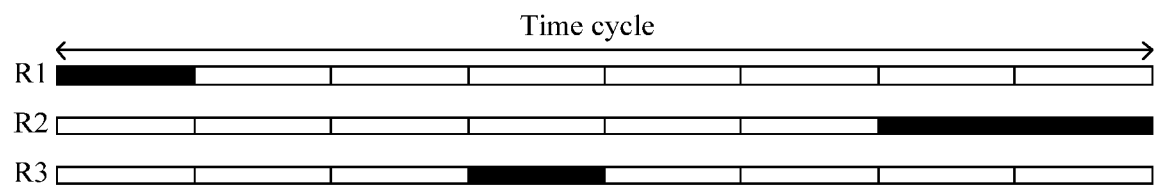
FIG. 6 is a schematic diagram of a length of still another available time window according to an embodiment of this application.

In another example, the type-2 station transmits data to the access point only within a specific period of time. Sending of data by the type-2 station is usually regular transmission agreed upon by the type-2 station with the access point in advance. For example, in an urban environment monitoring network, conventional information such as temperature and humidity only needs to be collected on time, and no burst data is sent. In such a scenario, for a type-2 station, addition of time periods of available time windows of type-1 stations close to the type-2 station does not need to cover the entire time cycle, provided that an available type-1 station can be found at an agreed transmission time, as shown in FIG. 6.

Further, when the access point or the type-2 station needs to transmit data at an end of an available time window of a currently available type-1 station, a remaining time of the window may be insufficient to complete a data transmission process. In this case, there are two processing solutions.

1. If the access point or the type-2 station determines that the remaining time of the available time window of the currently available type-1 station is insufficient to complete an exchange process, the access point or the type-2 station temporarily does not send the data, but waits until an available time window of a next available type-1 station starts, and then sends the data.

Figure 7:
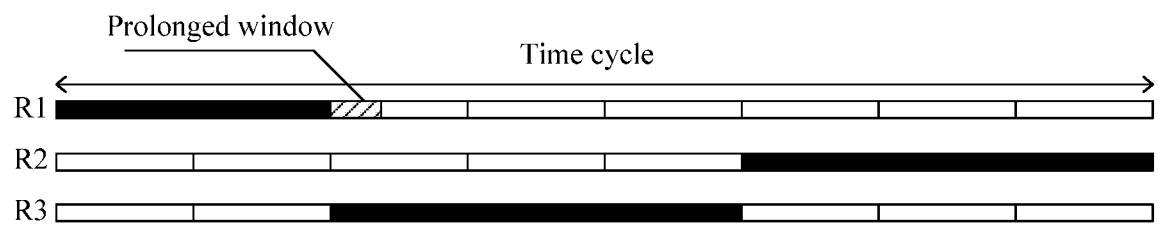
FIG. 7 is a schematic diagram of a length of yet another available time window according to an embodiment of this application.

2. The access point or the type-2 station sends the data to the currently available type-1 station. If the corresponding type-1 station determines that a remaining time of a currently available time window of the type-1 station is insufficient to complete the exchange process, a length of the window is appropriately prolonged, until the current data exchange process is completed, as shown in FIG. 7.

Step 202. The access point broadcasts the notification message in the basic service set.

Therefore, after receiving the notification message, the type-1 station determines, based on the identifiers of the type-1 stations and the available time window information, a start moment of the available time window in which the type-1 station functions as the relay station and a length of the available time window, and/or therefore, after receiving the notification message, the type-2 station determines, based on the identifiers of the type-1 stations and the available time window information, a relay station that can be used.

That after receiving the notification message, the type-2 station determines, based on the identifiers of the type-1 stations and the available time window information, the relay station that can be used is specifically that the type-2 station can determine a type-1 station that is available at a current moment, in other words, a station or stations that are in the active state and that function as relays at the current moment. On the one hand, any type-2 station can learn, through channel listening, of stations existing around the type-2 station, and a set of these stations is referred to as a first station set. On the other hand, the type-2 station learns, based on identifiers of type-1 stations in the received notification message, type-1 stations that are used as relay stations in the basic service set to which the type-2 station belongs. A set of these type-1 stations is referred to as a second station set. An intersection set of the first station set and the second station set is a potential relay station set required by the type-2 station. In other words, the type-2 station needs to select at least one station from this relay station as a currently used relay station. In the process in which the type-2 station determines at least one station from the relay station as a relay station, a system color of the type-2 station and the available time window information of the notification message further need to be considered. For a specific example, refer to step 205.

Step 203. A station receives the notification message.

The station may receive a notification message broadcast by the access point, or may receive a notification message forwarded by another type-1 station.

Step 204. When an identifier of the station matches one of identifiers of at least two type-1 stations included in the notification message, the station determines, based on the identifier of the type-1 station and the available time window information, a time period of an available time window in which the station is used as a relay station.

Step 205. When the station needs to communicate with the access point by using a relay station, the station determines, based on the identifiers of the at least two type-1 stations and the available time window information, at least one type-1 station as an available relay station.

Actually, when determining a currently available relay station, in addition to the identifiers of the at least two type-1 stations and the available time window information, the access point or the type-2 station further needs to use a current system time, namely, an internal clock of the access point or the type-2 station. For example, a current system time of a type-2 station is 1010, and based on the identifier of the type-1 station and the available time window information in the notification message, 10 type-1 stations (a station 1 to a station 10) function as a relay by turns from a moment 0. Each available time window is 200, and there is no interval between available time windows of type-1 stations that are adjacent in rankings. Based on this, the type-2 station may deduce that a type-1 station that functions as a relay at a current moment is numbered ⌈1010/200⌉=6, in other words, is a station 6.

The steps of the method shown in FIG. 4 may be specifically implemented by the computer device shown in FIG. 3. For example, the method steps of step 202 and step 203 may be implemented by using the communications interface 104. The method steps of step 204 and step 205 may be implemented by the processor 101.

Figure 8:
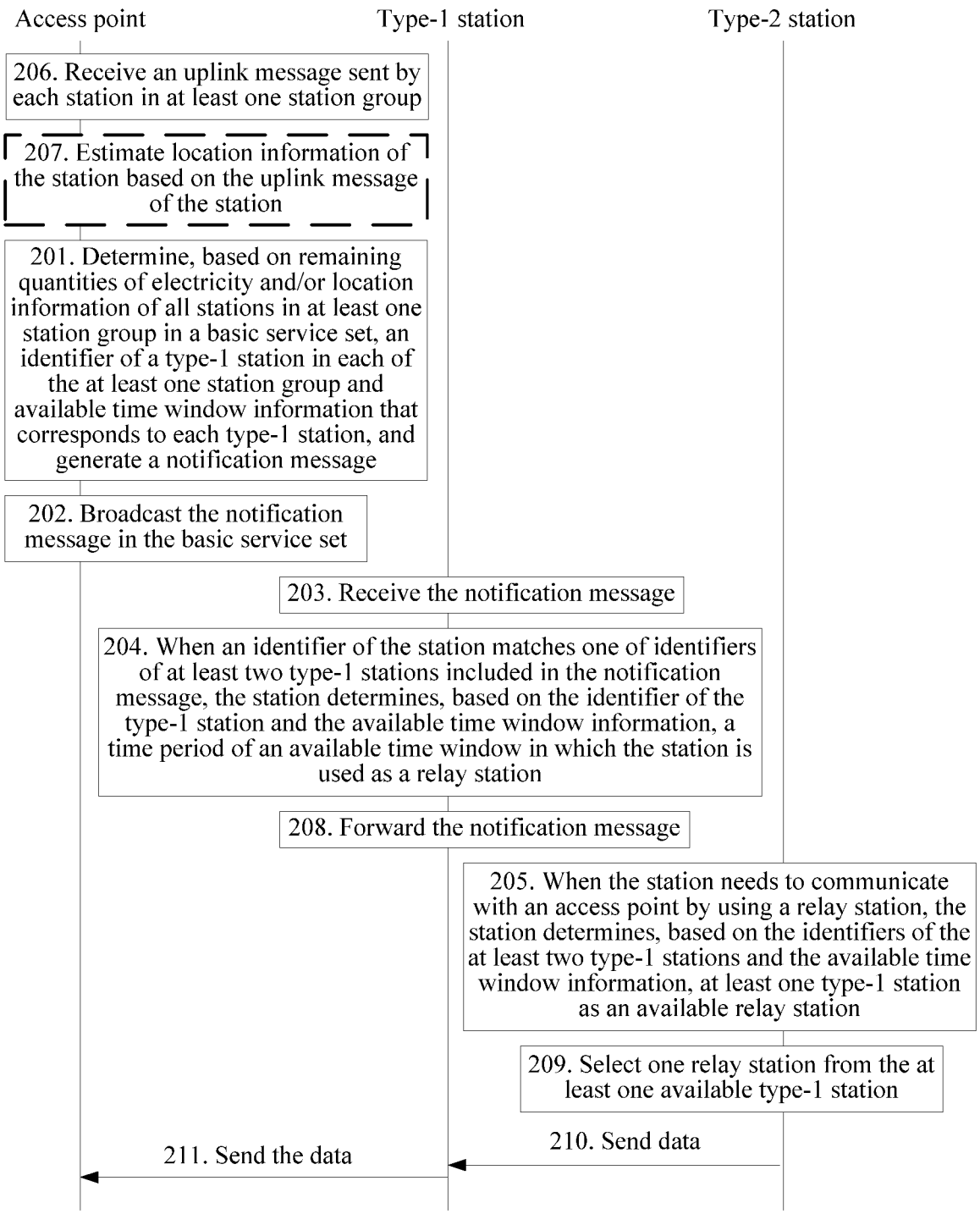
FIG. 8 is a flowchart of another station relay method according to an embodiment of this application.

As shown in FIG. 8, before the access point generates the notification message, in other words, before step 201, the method further includes the following specific steps.

Step 206. The access point receives an uplink message sent by each station in the at least one station group.

The uplink message includes a remaining quantity of electricity of the station. The uplink message of the station further includes location information of the station that is estimated by the station based on a downlink message sent by the access point to the station.

Alternatively, after step 206, the method further includes step 207.

Step 207. The access point estimates location information of the station based on the uplink message of the station.

After the station determines, based on the identifier of the type-1 station and the available time window information, a start moment of the available time window in which the station is used as a relay station and a length of the available time window, in other words, after step 204 of the type-1 station, the method further includes:

Step 208. The type-1 station forwards the notification message.

The type-1 station forwards the notification message to another station.

After the determining, by the station based on the identifiers of the at least two type-1 stations and the available time window information, at least one type-1 station as an available relay station, in other words, after step 205 of the type-2 station, the method further includes:

Step 209. The station selects one relay station from the at least one available type-1 station.

Step 210. A type-2 station sends data to the type-1 station.

Step 211. The type-1 station sends the data to the access point.

It should be noted that for downlink transmission, to be specific, when the access point sends data to the station, the data sent by the access point is forwarded by a relay and then reaches the station. In terms of a specific transmission manner, there are two schemes:

1. A unicast scheme is: before sending data, the access point first determines type-1 stations that may exist between the access point and a target type-2 station, and then selects one of the type-1 stations and transmits the data to the selected type-1 station.

2. A multicast scheme is: the access point uses a special address, and the special address is an address used to indicate a type-1 station set, or in other words, is usually a multicast address. When the access point is to send data to a target type-2 station, the access point sends the data directly to the special address (without a need to determine a currently available type-1 station). After receiving a downlink frame of the access point, a plurality of type-1 stations that are currently in the active state determine, based on a destination address (English full name: Destination Address, DA for short) field in the frame, whether the target type-2 station loses contact with the plurality of type-1 stations, and if yes, forward the frame to the target type-2 station; otherwise, do not forward the frame. Because a plurality of candidate type-1 stations of a same type-2 station may be in the active state at the same time, a specific forwarding manner may be a method for simultaneous forwarding. To be specific, after receiving the downlink frame of the access point, the type-1 stations forward the downlink frame to the target type-2 station at the same time after a time interval of an SIFS. Downlink frames forwarded by different type-1 stations should have same content, a same modulation and coding scheme (MCS for short), and a same scrambling seed, to ensure that signals of different type-1 stations can still be demodulated after being superposed.

For uplink transmission, in other words, when the station transmits data to the access point, there are also two specific transmission schemes:

1. A unicast scheme is: the type-2 station needs to be capable of determining currently available type-1 stations, to select one of the currently available type-1 stations and send a unicast frame to the selected currently available type-1 station. In this case, the type-2 station needs to obtain the type-1 station and the corresponding available time window information in advance. To be specific, after the access point sends notification information to the type-1 station, the type-1 station further needs to forward the information to all type-2 stations.

2. A multicast scheme similar to downlink transmission, where a special address is a multicast address used to indicate a type-1 station set. When the type-2 station needs to send data, the type-2 station does not need to determine a currently available type-1 station but directly sends the data to the multicast address. This means that after receiving the notification information of the access point, the type-1 station does not need to forward the notification information to the type-2 station. After receiving an uplink frame of the type-2 station, a plurality of type-1 stations may forward the uplink frame to the access point by using a method for simultaneous forwarding.

The unicast schemes in the uplink transmission and the downlink transmission are preferred schemes.

It should be noted that there is no correspondence between the two downlink transmission manners and the two uplink transmission manners. To be specific, if the unicast scheme is used in downlink, the unicast scheme or the multicast scheme may be used in uplink; or if the multicast scheme is used in downlink, the unicast scheme or the multicast scheme may be used in uplink.

For the unicast scheme in the uplink transmission, after determining the available type-1 station, the type-2 station further needs to determine an MCS to be used for data transmission. In a method, the type-2 station estimates and stores in advance MCS information of links between the type-2 station and all type-1 stations nearby, and directly invokes the MCS information during uplink transmission. In another scheme, the type-1 station sends a downlink frame in the available time window of the type-1 station, where the downlink frame carries transmit power used for sending the downlink frame. The type-2 station receives the downlink frame and estimates a downlink channel based on this, so as to estimate an MCS of the uplink transmission based on channel reciprocity.

Particularly, the type-1 station needs to calculate, based on a TSF of the access point and an internal clock of the type-1 station, a moment at which the type-1 station starts to function as the relay station. The station needs to calculate, based on a TSF from the access point or the type-1 station and an internal clock of the type-1 station, a type-1 station that functions as the relay station at any moment. The TSF of the access point and/or the relay station is obtained directly from a management frame (for example, a beacon) from the access point and/or the relay station. The internal clock of the type-1 station is obtained through timing by a local oscillator. However, because there is an error of the crystal oscillator, an internal clock of a device inevitably generates a drift (Drift). An existing 802.11 standard allows an internal clock of a Wi-Fi device to have an error of ±20 ppm (5 GHz frequency band) or ±25 ppm (2.4 GHz frequency band).

To ensure that the type-2 station can accurately obtain the available time window of the type-1 station, the following methods may be used:

1. A maximum possible clock drift of the type-2 station in one time cycle is far less than the length of the available time window of the type-1 station. In this way, the clock drift may be omitted compared with the available time window. For example, one time cycle is seven days. There are 100 type-1 stations in a region. A length of an available time window of each type-1 station is V=7×24×3600/100=6048 s. However, a maximum possible clock drift (2.4 GHz frequency band) in one time cycle is U=7×24×3600×50/106=30.24 s<V. The station may wake up 30 s later than a theoretical start moment of an available time window of a current type-1 station, and if the station attempts to forward data by using the type-1 station, the station can be definitely successful.

2. (Preferred scheme) Clock drift compensation, to be specific, the type-2 station corrects a clock drift of the type-2 station by using a TSF from the access point and/or the type-1 station. The TSF is a current system time (which actually is also a current value of an internal clock of the access point and/or the type-1 station) added by the access point and/or the type-1 station to a beacon frame, for synchronization of the type-2 station and the type-1 station or the access point, or synchronization of the type-1 station and the access point. A variety of methods for clock drift compensation have been proposed in the industry and academia. A simple method is: A station receives a first beacon (whose TSF is t1), and in this case, the station synchronizes an internal clock to t1 (to be specific, a current value of the internal clock is set to t1). When the station receives a second beacon (whose TSF is t2), the internal clock is t3. In this way, it may be obtained through calculation that a clock offset compensation amount of the station is $\Delta=(t3-t2)/(t2-t1)$. Assuming that a station is synchronized with the access point and/or the type-1 station (where in other words, a beacon whose TSF is to is received) at a moment to, when an internal clock of the station is t4, the internal clock should be corrected to $t4-(t4-t0)\times\Delta$. In this way, accurate time synchronization of the station and the access point and/or the type-1 station can be ensured.

Embodiment 2

Figure 9:
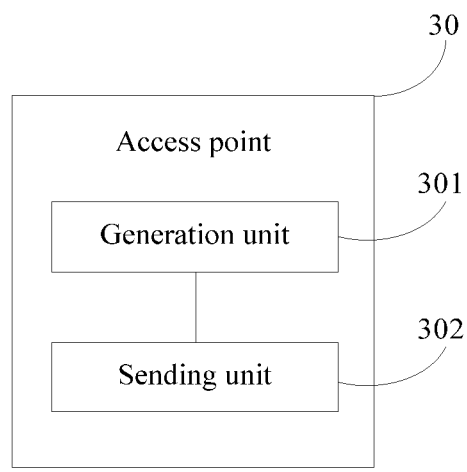
FIG. 9 is a schematic structural diagram of an access point according to an embodiment of this application.

This embodiment of the present invention provides an access point 30. As shown in FIG. 9, a basic service set to which the access point belongs includes at least one station group. Each station group includes at least two type-1 stations and at least one type-2 station. The type-2 station is a station that needs to communicate with the access point by using the type-1 station. The access point includes: a generation unit 301, configured to: determine, based on remaining quantities of electricity and/or location information of all stations in the at least one station group in the basic service set, identifiers of the type-1 stations in each of the at least one station group and available time window information that corresponds to each type-1 station, and generate a notification message, where the notification message includes relay enabling information of the at least one station group, relay enabling information of each station group includes the identifiers of the at least two type-1 stations in the station group and the available time window information of each of the at least two type-1 stations, the available time window information is used to indicate a time period of an available time window, and each type-1 station remains in an active state in a corresponding available time window and functions as a relay station for communication between the access point and the type-2 station; and a sending unit 302, configured to broadcast, in the basic service set, the notification message generated by the generation unit 301, so that after receiving the notification message, the type-1 station determines, based on the identifier of the type-1 station and the available time window information, a time period that is of the available time window and in which the type-1 station functions as the relay station, and/or so that after receiving the notification message, the type-2 station determines, based on the identifiers of the type-1 stations and the available time window information, a relay station that can be used by the type-2 station.

In this way, first, the access point determines, based on the remaining quantities of electricity and/or the location information of all the stations in the at least one station group in the basic service set, the identifiers of the type-1 stations in each of the at least one station group and the available time window information that corresponds to each type-1 station, generates the notification message, and then broadcasts, to all stations in the basic service set by using the notification message, at least two type-1 stations that are included in each station group, that can remain in the active state in corresponding available time windows, and that function as relay stations for communication between the access point and the type-2 station, so that after receiving the notification message, the type-1 station determines, based on the identifier of the type-1 station and the available time window information, a start moment of the available time window in which the type-1 station functions as the relay station and a length of the available time window, and/or so that after receiving the notification message, the type-2 station determines, based on the identifiers of the type-1 stations and the available time window information, the relay station that can be used. Therefore, the station that needs to communicate with the access point by using the relay station can select different type-1 stations as relay stations in different time periods, so that all the stations in the basic service set have a substantially same power consumption speed.

Figure 10:
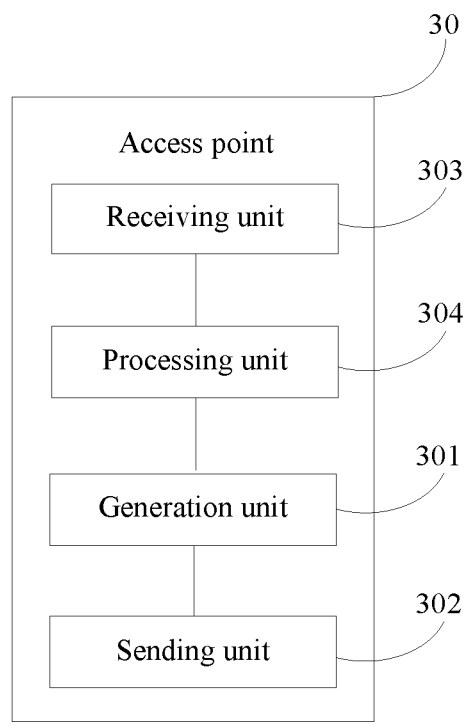
FIG. 10 is a schematic structural diagram of another access point according to an embodiment of this application.

Further, as shown in FIG. 10, the access point 30 further includes: a receiving unit 303, configured to receive an uplink message sent by each station in the basic service set, where the uplink message includes a remaining quantity of electricity of the station; and a processing unit 304, configured to estimate location information of the station based on the uplink message of the station.

In this embodiment, the access point 30 is presented in a form of a functional unit. The "unit" herein may refer to an application-specific integrated circuit (ASIC for short), a processor and a memory executing one or more software or firmware programs, an integrated logic circuit, and/or another device that can provide the foregoing functions. In a simple embodiment, a person skilled in the art may figure out that the access point 30 may be in a form shown in FIG. 9. The generation unit 301 and the sending unit 302 may be implemented by using the computer device in FIG. 3. Specifically, the sending unit 302 may be implemented by using the communications interface 104, and the generation unit 301 may be implemented by using the processor 101. Further, in another embodiment, the receiving unit 303 may be implemented by using the communications interface 104, and the processing unit 304 may be implemented by using the processor 101.

Embodiment 3

Figure 11:
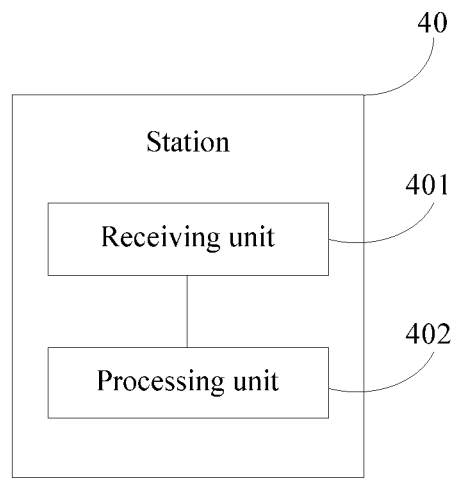
FIG. 11 is a schematic structural diagram of a station according to an embodiment of this application.

This embodiment of the present invention provides a station 40. As shown in FIG. 11, the station 40 includes: a receiving unit 401, configured to receive a notification message broadcast by an access point, where the notification message includes relay enabling information of at least one station group, relay enabling information of each station group includes identifiers of at least two type-1 stations in the station group and available time window information of each type-1 station, the available time window information is used to indicate a time period of an available time window, each type-1 station remains in an active state in a corresponding available time window and functions as a relay station for communication between the access point and a type-2 station, the access point, the type-2 station, and all the type-1 stations belong to a same basic service set, the basic service set includes at least one station group, each station group includes the at least two type-1 stations and at least one type-2 station, and the type-2 station is a station that needs to communicate with the access point by using the type-1 station; and a processing unit 402, configured to: when an identifier of the station matches one of the identifiers of the at least two type-1 stations included in the notification message, determine, based on identifiers of the type-1 stations and the available time window information, a time period of an available time window in which the station is used as a relay station.

In this way, after the station in the basic service set receives the notification message that is broadcast by the access point and that includes the at least two type-1 stations that can remain in the active state in the corresponding available time windows and that function as relay stations for communication between the access point and the type-2 station, when the station determines that the identifier of the station matches one of the identifiers of the at least two type-1 stations included in the notification message, the station determines a time period of the available time window in which the station is used as the relay station. Therefore, the station that needs to communicate with the access point by using the relay station can select different type-1 stations as relay stations in different time periods, so that all stations in the basic service set have a substantially same power consumption speed.

Figure 12:
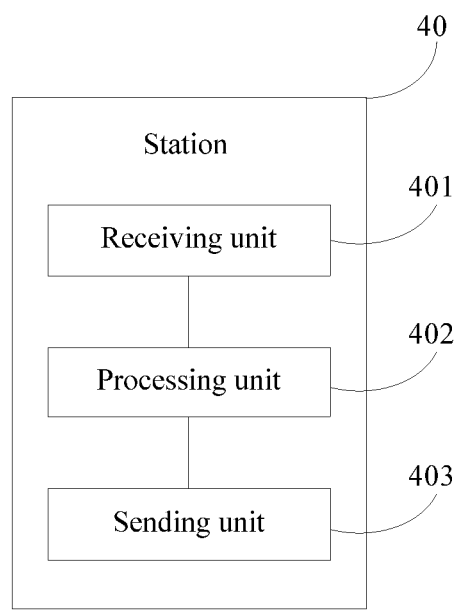
FIG. 12 is a schematic structural diagram of another station according to an embodiment of this application.

Further, as shown in FIG. 12, the station 40 further includes: a sending unit 403, configured to forward the notification message.

In this embodiment, the station 40 is presented in a form of a functional unit. The "unit" herein may refer to an application-specific integrated circuit (ASIC for short), a processor and a memory executing one or more software or firmware programs, an integrated logic circuit, and/or another device that can provide the foregoing functions. In a simple embodiment, a person skilled in the art may figure out that the station 40 may be in a form shown in FIG. 11. The receiving unit 401 and the processing unit 402 may be implemented by using the computer device in FIG. 3. Specifically, the receiving unit 401 may be implemented by using the communications interface 104, and the processing unit 402 may be implemented by using the processor 101.

Embodiment 4

Figure 13:
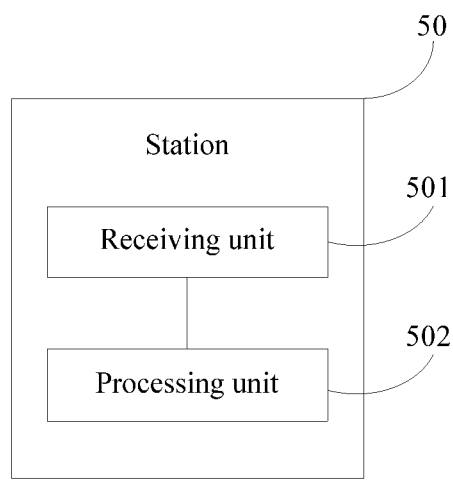
FIG. 13 is a schematic structural diagram of still another station according to an embodiment of this application.

This embodiment of the present invention provides a station 50. As shown in FIG. 13, the station 50 includes: a receiving unit 501, configured to receive a notification message, where the notification message includes relay enabling information of at least one station group, relay enabling information of each station group includes identifiers of at least two type-1 stations in the station group and available time window information of each type-1 station, the available time window information is used to indicate a time period of an available time window, each type-1 station remains in an active state in a corresponding available time window and functions as a relay station for communication between the access point and a type-2 station, the access point, the type-2 station, and all the type-1 stations belong to a same basic service set, the basic service set includes at least one station group, each station group includes at least two type-1 stations and at least one type-2 station, and the type-2 station is a station that needs to communicate with the access point by using the type-1 station; and a processing unit 502, configured to: when an identifier of the station is not included in the notification message and the station needs to communicate with the access point by using a relay station, determine, based on the identifiers of the at least two type-1 stations and the available time window information, at least one type-1 station as an available relay station.

In this way, after the station in the basic service set receives the notification message that is broadcast by the access point and that includes the at least two type-1 stations that can remain in the active state in the corresponding available time windows and that function as relay stations for communication between the access point and the type-2 station, when the station determines that the identifier of the station is not included in the notification message and the station needs to communicate with the access point by using the relay station, the station determines, based on the identifiers of the at least two type-1 stations and the available time window information, at least one type-1 station as an available relay station. Therefore, the station that needs to communicate with the access point by using the relay station can select different type-1 stations as relay stations in different time periods, so that all stations in the basic service set have a substantially same power consumption speed.

In this embodiment, the station 50 is presented in a form of a functional unit. The "unit" herein may refer to an application-specific integrated circuit (ASIC for short), a processor and a memory executing one or more software or firmware programs, an integrated logic circuit, and/or another device that can provide the foregoing functions. In a simple embodiment, a person skilled in the art may figure out that the station 50 may be in a form shown in FIG. 13. The receiving unit 501 and the processing unit 502 may be implemented by using the computer device in FIG. 3. Specifically, the receiving unit 501 may be implemented by using the communications interface 104, and the processing unit 502 may be implemented by using the processor 101.

Same or similar parts of the embodiments in this specification may be cross-referenced. Details are not described herein again.

Persons of ordinary skill in the art should understand that all or part of the steps of the methods in the embodiments may be implemented by a program instructing relevant hardware. The program may be stored in a computer readable storage medium. When the program is executed, the steps of the methods in the embodiments are performed. The storage medium includes: any medium that can store program codes, such as a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    determining, by an access point, a respective identifier of each type-1 station in each station group of at least one station group of a basic service set, and determining respective available time window information that corresponds to each respective type-1 station in each station group of the at least one station group, wherein the access point belongs to the basic service set, wherein each station group of the at least one station group comprises a plurality of type-1 stations and at least one type-2 station, and each type-2 station of the at least one type-2 station of each station group communicates with the access point using one of the plurality of type-1 stations comprised in the same station group as the respective type-2 station, and wherein the respective identifier of each type-1 station and the respective available time window information that corresponds to each respective type-1 station is determined based on current quantities of electricity or location information of all stations in each station group of the at least one station group;
    generating a notification message, wherein the notification message comprises relay enabling information of each station group of the at least one station group, and for each station group of the at least one station group, the relay enabling information of the respective station group comprises the identifiers of the plurality of type-1 stations comprised in the respective station group and the respective available time window information of each of the plurality of type-1 stations comprised in the respective station group, wherein the respective available time window information of each of the plurality of type-1 stations comprised in the respective station group indicates a respective time period of an available time window corresponding to the respective type-1 station, and, for each type-1 station of the plurality of type-1 stations comprised in the respective station group, the respective type-1 station remains in an active state in the respective time period of the available time window corresponding to the respective type-1 station and functions as a relay station for communication between the access point and one or more of the at least one type-2 station comprised in the same station group as the respective type-1 station; and
    broadcasting, by the access point, the notification message in the basic service set, wherein after receiving the notification message:
        each type-1 station in each station group of the at least one station group determines, based on the identifiers of the plurality of type-1 stations comprised in each station group of the at least one station group and the respective available time window information of each of the plurality of type-1 stations comprised in each station group of the at least one station group, a respective time period of the available time window in which the respective type-1 station functions as the relay station; or
        each type-2 station determines, based on the identifiers of the plurality of type-1 stations comprised in each station group of the at least one station group and the respective available time window information of each of the plurality of type-1 stations comprised in each station group of the at least one station group, a current relay station for the respective type-2 station to use to communicate.

2. The method according to claim 1, wherein, for each type-1 station of each station group of the at least one station group, a start moment of the respective time period of the available time window is determined based on a ranking of the respective identifier of the type-1 station in the relay enabling information.

3. The method according to claim 1, wherein:
    the relay enabling information comprises a plurality of pieces of relay enabling information, each piece of relay enabling information comprises a respective first start moment, and the respective first start moment indicates a respective start moment of a time period of an available time window of a first type-1 station; or
    the relay enabling information comprises a plurality of pieces of relay enabling information, the notification message comprises a second start moment, and a start moment of a time period of an available time window of a first type-1 station in each piece of relay enabling information is the same as the second start moment.

4. The method according to claim 1, wherein:
    the relay enabling information comprises a plurality of pieces of relay enabling information, each piece of relay enabling information corresponds to a respective type-1 station and comprises a respective first duration, and a length of the time period of the available time window of the respective type-1 station corresponding to the respective piece of relay enabling information is the same as the first duration comprised in the respective piece of relay enabling information corresponding to the respective type-1 station; or the relay enabling information comprises a plurality of pieces of relay enabling information, the notification message comprises a second duration, and a length of the time period of the available time window of each type-1 station corresponding to one of the pieces of relay enabling information is the second duration.

5. The method according to claim 1, wherein a length of the time period of the available time window of each type-1 station is a preset same length.

6. The method according to claim 1, wherein:

the relay enabling information comprises a plurality of pieces of relay enabling information, each piece of relay enabling information further comprises a third duration, and the third duration indicates a time interval between available time windows of two type-1 stations that are adjacent in rankings in the relay enabling information; or the relay enabling information comprises a plurality of pieces of relay enabling information, the notification message further comprises a fourth duration, and a time interval between available time windows of two type-1 stations that are adjacent in rankings in each piece of relay enabling information is the fourth duration.

7. The method according to claim 1, wherein:

the relay enabling information comprises a plurality of pieces of relay enabling information, each piece of relay enabling information comprises a respective first duty cycle, and each respective first duty cycle indicates a ratio of the length of the time period of the respective available time window of each respective type-1 station corresponding to the respective piece of relay enabling information to the time interval between respective available time windows of two type-1 stations that are adjacent in rankings in the relay enabling information; or the relay enabling information comprises a plurality of pieces of relay enabling information, the notification message comprises a second duty cycle, and a ratio of the length of the time period of the respective available time window of each type-1 station corresponding to each piece of relay enabling information to the time interval between the respective available time windows of the two type-1 stations that are adjacent in rankings in the relay enabling information is equal to a value of the second duty cycle.

8. The method according to claim 1, wherein before generating, by the access point, the notification message, the method further comprises:

receiving, by the access point, a respective uplink message sent by each station in each station group of the at least one station group, wherein each respective uplink message comprises a current quantity of electricity of the respective station.

9. An access point, comprising:

a processor, configured to:

determine a respective identifier of each type-1 station in each station group of at least one station group in a basic service set, and determine a respective available time window information that corresponds to each respective type-1 station in each station group of the at least one station group, wherein the access point belongs to the basic service set, wherein each station group of the at least one station group comprises a plurality of type-1 stations and at least one type-2 station, and each type-2 station of the at least one type-2 station of each station group communicates with the access point using one of the plurality of type-1 stations comprised in the same station group as the respective type-2 station, and wherein the respective identifier of each type-1 station and the respective available time window information that corresponds to each respective type-1 station is determined based on current quantities of electricity or location information of all stations in each station group of the at least one station group, and generate a notification message, wherein the notification message comprises relay enabling information of each station group of the at least one station group, and for each station group of the at least one station group, the relay enabling information of the respective station group comprises the identifiers of the plurality of type-1 stations comprised in the respective station group and the respective available time window information of each of the plurality of type-1 stations comprised in the respective station group, wherein the respective available time window information of each of the plurality of type-1 stations comprised in the respective station group indicates a respective time period of a respective available time window corresponding to the respective type-1 station, and for each type-1 station of the plurality of type-1 stations comprised in the respective station group, the respective type-1 station remains in an active state in the respective available time window corresponding to the respective type-1 station and functions as a relay station for communication between the access point and one or more of the at least one type-2 station comprised in the same station group as the respective type-1 station; and a communications interface, configured to:

broadcast, in the basic service set, the notification message generated by the processor, wherein after receiving the notification message:

each type-1 station in each station group of the at least one station group determines, based on the identifiers of the plurality of type-1 stations comprised in each station group of the at least one station group and the respective available time window information of each of the plurality of type-1 stations comprised in each station group of the at least one station group, a respective time period of the available time window in which the respective type-1 station functions as the relay station; or each type-2 station determines, based on the identifiers of the plurality of type-1 stations comprised in each station group and the respective available time window information corresponding to each respective type-1 station, a current relay station for the respective type-2 station to use to communicate.

10. The access point according to claim 9, wherein, for each type-1 station of each station group of the at least one station group, a start moment of the respective time period of the available time window is determined based on a ranking of the respective identifier of the respective type-1 station in the relay enabling information.

11. The access point according to claim 9, wherein:

the relay enabling information comprises a plurality of pieces of relay enabling information, each piece of relay enabling information comprises a respective first start moment, and the respective first start moment indicates a respective start moment of a time period of an available time window of a first type-1 station; or the relay enabling information comprises a plurality of pieces of relay enabling information, the notification message comprises a second start moment, and a start moment of a time period of an available time window of a first type-1 station in each piece of relay enabling information is the same as the second start moment.

12. The access point according to claim 9, wherein:

the relay enabling information comprises a plurality of pieces of relay enabling information, each piece of relay enabling information corresponds to a respective type-1 station and comprises a respective first duration, and a length of the time period of the available time window of the respective type-1 station corresponding to the respective piece of relay enabling information is the same as the first duration comprised in the respective piece of relay enabling information corresponding to the type-1 station; or the relay enabling information comprises a plurality of pieces of relay enabling information, the notification message comprises a second duration, and a length of the time period of the available time window of each type-1 station corresponding to one of the pieces of relay enabling information is the second duration.

13. The access point according to claim 9, wherein a length of the time period of the available time window of each type-1 station is a preset same length.

14. The access point according to claim 9, wherein:

the relay enabling information comprises a plurality of pieces of relay enabling information, each piece of relay enabling information further comprises a third duration, and the third duration indicates a time interval between available time windows of two type-1 stations that are adjacent in rankings in the relay enabling information; or the relay enabling information comprises a plurality of pieces of relay enabling information, the notification message further comprises a fourth duration, and a time interval between available time windows of two type-1 stations that are adjacent in rankings in each piece of relay enabling information is the fourth duration.

15. The access point according to claim 9, wherein:

the relay enabling information comprises a plurality of pieces of relay enabling information, each piece of relay enabling information further comprises a respective first duty cycle, and each respective first duty cycle indicates a ratio of the length of the time period of the respective available time window of each respective type-1 station corresponding to the respective piece of relay enabling information to the time interval between the available time windows of two type-1 stations that are adjacent in rankings in the relay enabling information; or the relay enabling information comprises a plurality of pieces of relay enabling information, the notification message comprises a second duty cycle, and the second duty cycle indicates that a ratio of the length of the time period of the respective available time window of each type-1 station in each piece of relay enabling information to the time interval between the respective available time windows of the two type-1 stations that are adjacent in rankings in the relay enabling information is equal to a value of the second duty cycle.

16. The access point according to claim 9, wherein:

the relay enabling information comprises a plurality of pieces of relay enabling information, each piece of relay enabling information further comprises a respective first time cycle, and each respective first time cycle indicates a respective time period in which the respective available time window information of the respective plurality of type-1 stations comprised in each respective piece of relay enabling information remains valid; or the notification message comprises a second time cycle, and the second time cycle indicates a time period in which the available time window information of all the type-1 stations in the basic service set remains valid; or the access point sends the first time cycle or the second time cycle to each type-1 station in the basic service set using a management frame.

17. The access point according to claim 16, wherein at any given moment in the first time cycle or the second time cycle, coverage of a type-1 station that remains in the active state and that functions as a relay station for communication between the access point and one or more type-2 station is capable of covering all the type-2 stations in the basic service set.

18. The access point according to claim 9, wherein the communications interface is further configured to:

receive a respective uplink message sent by each station in the at least one station group, wherein each respective uplink message comprises a respective current quantity of electricity of the respective station.

19. A first station, comprising:

a communications interface, configured to:

receive a notification message, wherein the notification message comprises relay enabling information of each station group of at least one station group comprised in a basic service set, the relay enabling information of each station group of the at least one station group comprises respective identifiers of each of a plurality of type-1 stations respectively comprised in each station group of the at least one station group, and respective available time window information of each type-1 station comprised in each station group of the at least one station group, wherein the respective available time window information of each type-1 station comprised in each station group indicates a respective time period of an available time window corresponding to the respective type-1 station, each type-1 station comprised in each station group remains in an active state in the respective time period of the available time window corresponding to the respective type-1 station and functions as a relay station for communication between an access point and at least one respective type-2 station comprised in the same station group as the respective type-1 station, wherein the access point belongs to the basic service set, each station group of the at least one station group comprises the plurality of type-1 stations and at least one respective type-2 station, and each type-2 station communicates with the access point using at least one of the plurality of type-1 stations comprised in the same station group as the respective type-2 station as a relay station; and a processor, configured to: when an identifier of the first station is not comprised in the notification message, and the first station needs to communicate with the access point using a relay station, determine, based on the respective identifiers of the plurality of type-1 stations and the respective available time window information, a first type-1 station as an available relay station.

20. A first station, comprising:

a communications interface, configured to:

receive a notification message broadcast by an access point, wherein the notification message comprises relay enabling information of each station group of at least one station group comprised in a basic service set, the relay enabling information of each station group comprises respective identifiers of each of a plurality of type-1 stations respectively comprised in each station group of the at least one station group, and respective available time window information of each type-1 station of each station group of the at least one station group, wherein the respective available time window information of each type-1 station indicates a respective time period of a respective available time window, each type-1 station of each station group remains in an active state in a the respective time period of the respective available time window and functions as a relay station for communication between the access point and one or more type-2 stations comprised in a same station group as the respective type-1 station, wherein the access point belongs to the basic service set, each station group of the at least one station group comprises the respective plurality of type-1 stations and at least one respective type-2 station, and each type-2 station communicates with the access point using at least one of the plurality of type-1 stations comprised in the same station group as the respective type-2 station as a relay station; and a processor, configured to:

when an identifier of the first station matches a first identifier comprised in the notification message, determine, based on the respective available time window information comprised in the notification message, a first time period of a respective available time window in which the first station acts as a relay station.

* * * * *